United States Patent
van Bibber et al.

(10) Patent No.: US 6,518,580 B1
(45) Date of Patent: *Feb. 11, 2003

(54) PROTON RADIOGRAPHY BASED ON NEAR-THRESHOLD CERENKOV RADIATION

(75) Inventors: Karl A. van Bibber, Berkeley, CA (US); Frank S. Dietrich, Walnut Creek, CA (US)

(73) Assignee: The United States of America as represented by the United States Department of Energy, Washington, DC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/442,065

(22) Filed: Nov. 16, 1999

Related U.S. Application Data

(60) Provisional application No. 60/108,544, filed on Nov. 16, 1998.

(51) Int. Cl.[7] .................................................. H01J 29/20
(52) U.S. Cl. ...................................... 250/397; 250/492.1
(58) Field of Search ......................... 250/492.1, 363.02, 250/390.02, 390.06, 390.03, 306, 307, 311, 309, 397, 398

(56) References Cited

U.S. PATENT DOCUMENTS

| | | | | |
|---|---|---|---|---|
| 3,832,545 A | * | 8/1974 | Bartko | 250/312 |
| 3,984,332 A | * | 10/1976 | Nelson et al. | 250/361 R |
| 4,284,895 A | * | 8/1981 | Morgan et al. | 250/445 T |
| 4,835,391 A | * | 5/1989 | Hartemann et al. | 250/361 R |
| 5,635,720 A | * | 6/1997 | Mooney et al. | 250/397 |
| 5,656,807 A | * | 8/1997 | Packard | 250/214 VT |
| 5,905,263 A | * | 5/1999 | Nishizawa et al. | 250/368 |
| 5,932,880 A | * | 8/1999 | Koguchi et al. | 250/397 |
| 6,158,244 A | * | 12/2000 | Poco et al. | 65/17.2 |
| 6,303,046 B1 | * | 10/2001 | Risen et al. | 106/162.2 |

* cited by examiner

*Primary Examiner*—John R. Lee
*Assistant Examiner*—Anthony Quash
(74) *Attorney, Agent, or Firm*—William C. Daubenspeck; Paul A. Gottlieb

(57) ABSTRACT

A Cerenkov imaging system for charged particle radiography that determines the energy loss of the charged particle beam passing through an object. This energy loss information provides additional detail on target densities when used with traditional radiographic techniques like photon or x-ray radiography. In this invention a probe beam of 800 MeV to 50 GeV/c charged particles is passed through an object to be imaged, an imaging magnetic spectrometer, to a silicon aerogel Cerenkov radiator where the charged particles emitted Cerenkov light proportional to their velocity. At the same beam focal plane, a particle scintillator produces a light output proportional to the incident beam flux. Optical imaging systems relay the Cerenkov and scintillator information to CCD's or other measurement equipment. A ratio between the Cerenkov and scintillator is formed, which is directly proportional to the line density of the object for each pixel measured. By rotating the object, tomographic radiography may be performed. By applying pulses of beam, discrete time-step movies of dynamic objects may be made.

12 Claims, 2 Drawing Sheets

PROTON RADIOGRAPHY BASED ON NEAR-THRESHOLD CERENKOV RADIATION

CROSS-REFERENCE TO RELATED APPLICATIONS

This Application claims priority from Provisional Patent Application No. 60/108,544 filed Nov. 16, 1998. The entire contents of such Provisional Patent Application are hereby incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to energy loss radiographic imaging of objects, particularly to energy loss radiographic imaging with charged particle beams, more particularly to energy loss radiographic imaging of the charged particle beams onto Cerenkov radiation media such that the energy loss of the beam may be spatially calculated for each xy pixel perpendicular to the beam axis, resulting in an XY radiograph related to the line integrated atomic density of the object being radiographed.

Cerenkov radiation (also referred to herein as Cerenkov light) is a coherent electromagnetic effect whereby a charged particle emits radiation while passing through a medium. The condition for Cerenkov radiation is that the velocity v of the particle must exceed the speed of light in the medium, or $v > c/n$, where c is the speed of light in a vacuum and n is the index of refraction within the medium. This defines the threshold velocity for Cerenkov radiation. The radiation is emitted in a cone with respect to the direction of flight of the particle, and the opening angle of the cone is given by the Cerenkov angle, $\cos(\theta_c) (n\beta)^{-1}$, where $\beta = v/c$. The number of Cerenkov photons radiated per unit path length through the medium between wavelengths $\lambda_1$ and $\lambda_2$ is given by $dN/dx = 2\pi\alpha \sin^2(\theta_c)(\lambda_1^{-1} - \lambda_2^{-1})$, and may be approximated for the optical range (400–700 nm) as $dN/dx \sim 500 \sin^2(\theta_c)$ cm$^{-1}$.

Automobile engines are an example of difficult objects which are resistant to traditional X-ray imaging, generating no information after the source beam has passed through several extinction depths of the material being viewed, i.e. all of the beam is absorbed.

Radiography using charged-particle beams has been suggested as an alternative to x-ray radiography with such target materials. High mass charged particles such as protons with energies of 800 MeV to 50 GeV/c have high penetration powers through such traditionally difficult to image objects, and have been used to image these types of objects. Even when proton imaging is used, however, only the flux is typically measured, giving limited information about the composition and density of the object being examined.

In conventional x-ray or proton radiography the number of probe particles removed from the beam by absorption or scattering in the target is the fundamental measurement used to infer the local column density of the target under study. The beam of probe particles passes through the target where scattering or absorption occurs, and a two dimensional image of the number of surviving beam particles is then constructed utilizing a suitable sensor such as a film or a scintillator coupled to a CCD camera.

However, radiography using charge-particle beams provides information on target composition through three mechanisms: attenuation, multiple scattering and energy loss. Unlike x-ray probes which suffer only absorption or scattering in the target, beams of protons, or other massive charged particles also suffer energy loss as they traverse a target through electromagnetic interactions between the charge of the particles and the electrons in the target material. Thus simply counting the number of surviving charged beam particles does not provide all of the available information since the velocity of the surviving beam particles is not measured. Measurement of the energy loss of the surviving beam particles will provide another fundamental measurement related to the local column density of the target.

Because each mechanism has a different dependence on atomic weight and number, imaging techniques that use any combination of the three mechanisms can provide more information on target composition than techniques that use only one.

Because the particle velocity is directly related to the energy loss suffered by the particle in passing through the target, which in turn depends on the composition and density of the target, the column density can be determined from a measurement of the Cerenkov light intensity produced by the portion of the beam that passes through a particular column of the target.

SUMMARY OF THE INVENTION

It is another object of the present invention to provide radiographic images utilizing charged particles such as protons, electrons, muons, pions, kaons, or other charged particles for penetrating objects which are resistant to traditional X-ray radiography.

It is another object of the present invention to measure the energy loss of a charged particle beam passing through a target.

It is a further object of the present invention to provide an image whose intensity is proportional to the velocity of the charged particles that have passed through the target.

It is still another object of the present invention to provide a Cerenkov camera to measure the energy loss of a charged particle beam in passing through a target by imaging Cerenkov radiation produced by said beam.

It is still another object of the invention to use pulsed bursts of charged particles onto a gated or switched energy loss Cerenkov camera in such a way as to produce movies of the internal motions of objects to be examined.

Briefly, these and other objects are provided by the present invention in which the energy loss of a charged particle beam passing through an object is imaged in Cerenkov radiation. The energy loss of the beam is determined by using a correlation between Cerenkov radiation which is produced by the high-speed charged particles passing through a radiator medium and the beam energy (beam flux) passing through the object, Cerenkov radiation is emitted from the radiator medium when a particle traverses the radiator medium when the speed of light in the radiator material lower than the speed of the traversing particle. Since the threshold velocity for Cerenkov light emission depends on the index of refraction of the radiator, the radiator material is chosen to provide a threshold just below the minimum velocity of the unattenuated particle beam (i.e., the lowest anticipated energy of particles emerging form the object).

Both the flux and speed of the particle determine how much Cerenkov radiation is emitted in the medium. Since we are interested in the additional information of the energy lost in transmission through the object, a scintillator is used to determine the particle flux. By dividing the Cerenkov radiation imaged on a given pixel by the corresponding particle flux determined by a scintillator, the energy loss of a particular pixel may be determined. When this procedure is applied throughout an array of pixels (for example in a CCD or photodiode array), an image of the energy loss through an object being viewed may be obtained. In simple terms, an image may be formed which represents the line integrated density of the object the beam has traversed.

By rotating the object to be viewed, sequential displays of line integrated density may be observed. Such information may then be used as input data into a Computer Aided Tomography (CAT) scanning algorithm, whereby the densities of regions of the device or object being viewed may be produced. By applying this technique to medical applications, it has been calculated that CAT scans of human biological samples may be produced with approximately 14 times less radiation exposure. Additionally, sequential series of bursts of protons (easily produced on such equipment) can be used to produce movies of dynamic machinery or processes. Dynamic events may be recorded using images from several synchronized CCD or photodiode arrays.

Other objects, advantages and features of the present invention will become apparent from the following description when considered in conjunction with the accompanying drawings wherein like of similar reference characters illustrate similar elements in the several views.

DETAILED DESCRIPTION OF THE INVENTION

Figure 1:
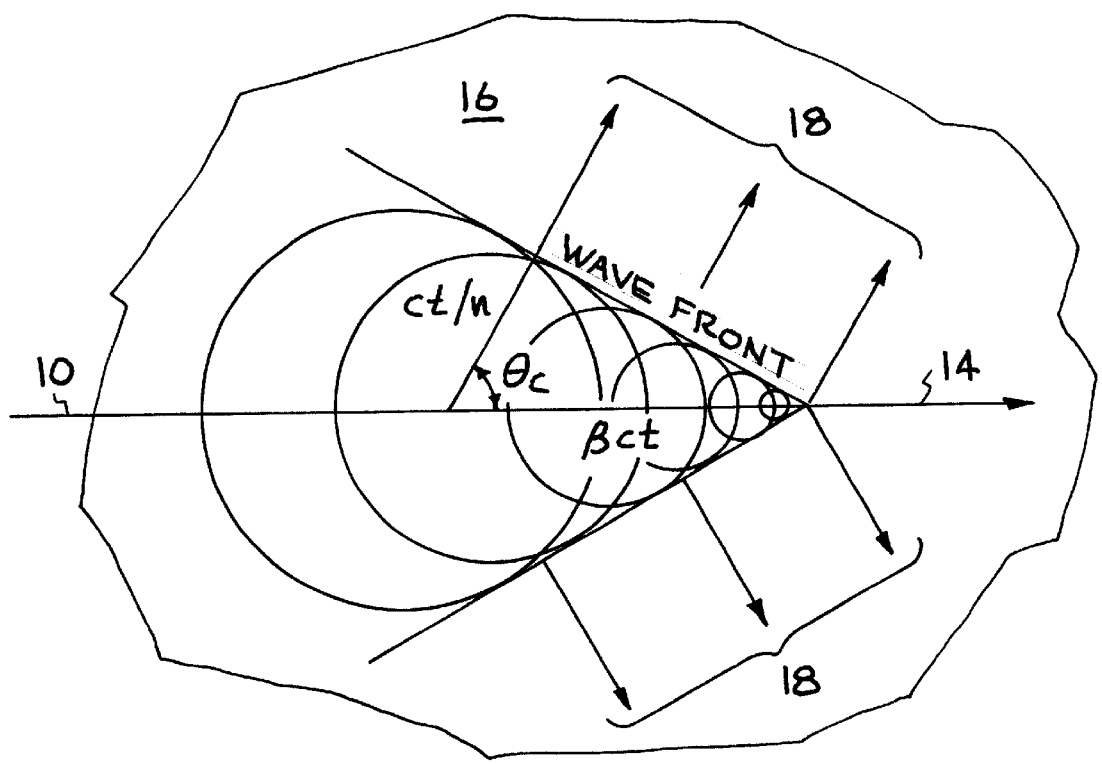
FIG. 1 is a schematic drawing illustrating the generation of Cerenkov radiation.
Figure 2:
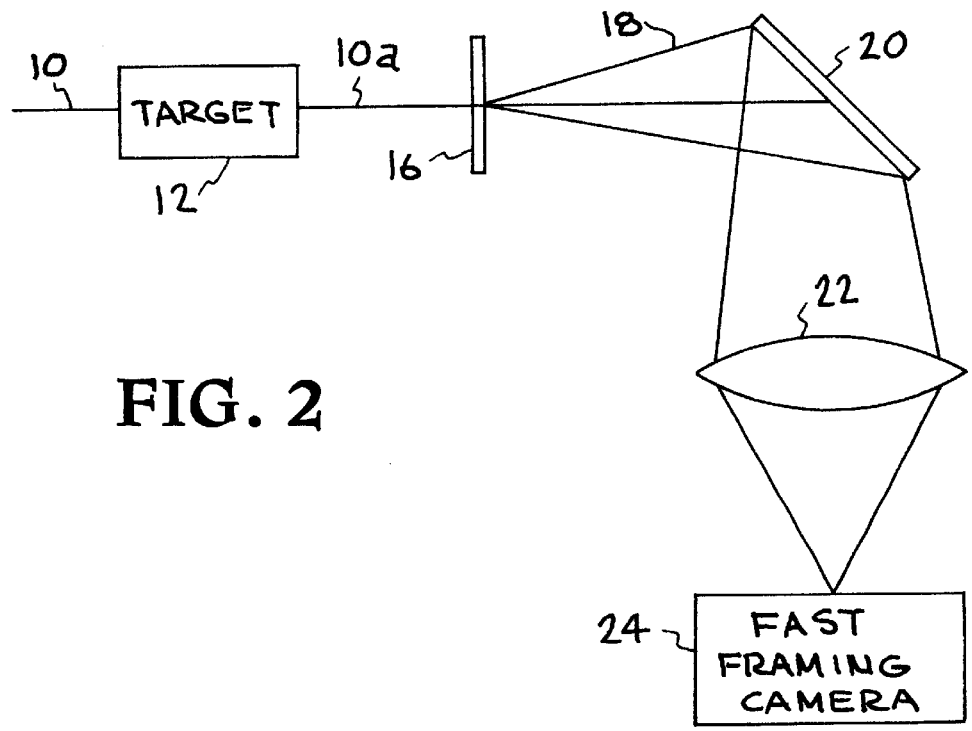
FIG. 2 is a schematic drawing illustrating Cerenkov imaging according to the present invention.

Referring now to the drawings and in particular to FIGS. 1 and 2, the velocity v of a charged particle beam 10 exiting a target 12 on path 14 may be inferred by passing it through a medium 16 whose index of refraction, n, is such that the velocity of light through the medium, c/n, is less than the velocity, v, of the particle. The particle will then emit Cerenkov light 18 at an angle $$\cos(\theta_c) = (n\beta)^{-1}, \text{ where } \beta = v/c \qquad (1)$$

where $\beta = v/c$, is the ratio of the particle's velocity to the speed of light in a vacuum.

For particle velocities, v, between the threshold velocity $\beta_t = 1/n$ and the maximum velocity $\beta = 1$, the number of Cerenkov photons emitted by a centimeter of radiator is $$N \approx 500[1 - 1/(\beta n)^2] \qquad (2)$$

which for velocities close to the threshold results in a nearly linear relationship between particle velocity and number of Cerenkov optical photons emitted. Since the particle velocity, v, reflects the energy loss suffered by the particle in passing through the target 12, which in turn depends on the composition and density of the target, the column density can be determined from a measurement of the Cerenkov light intensity produced by the portion of the beam that passes through a particular column of the target. The Cerenkov light 18 may be reflected by mirror 20 to an imaging lens 22 to an optical detection/intensity recording device such as a fast framing camera 24 (CCD camera).

Figure 3:
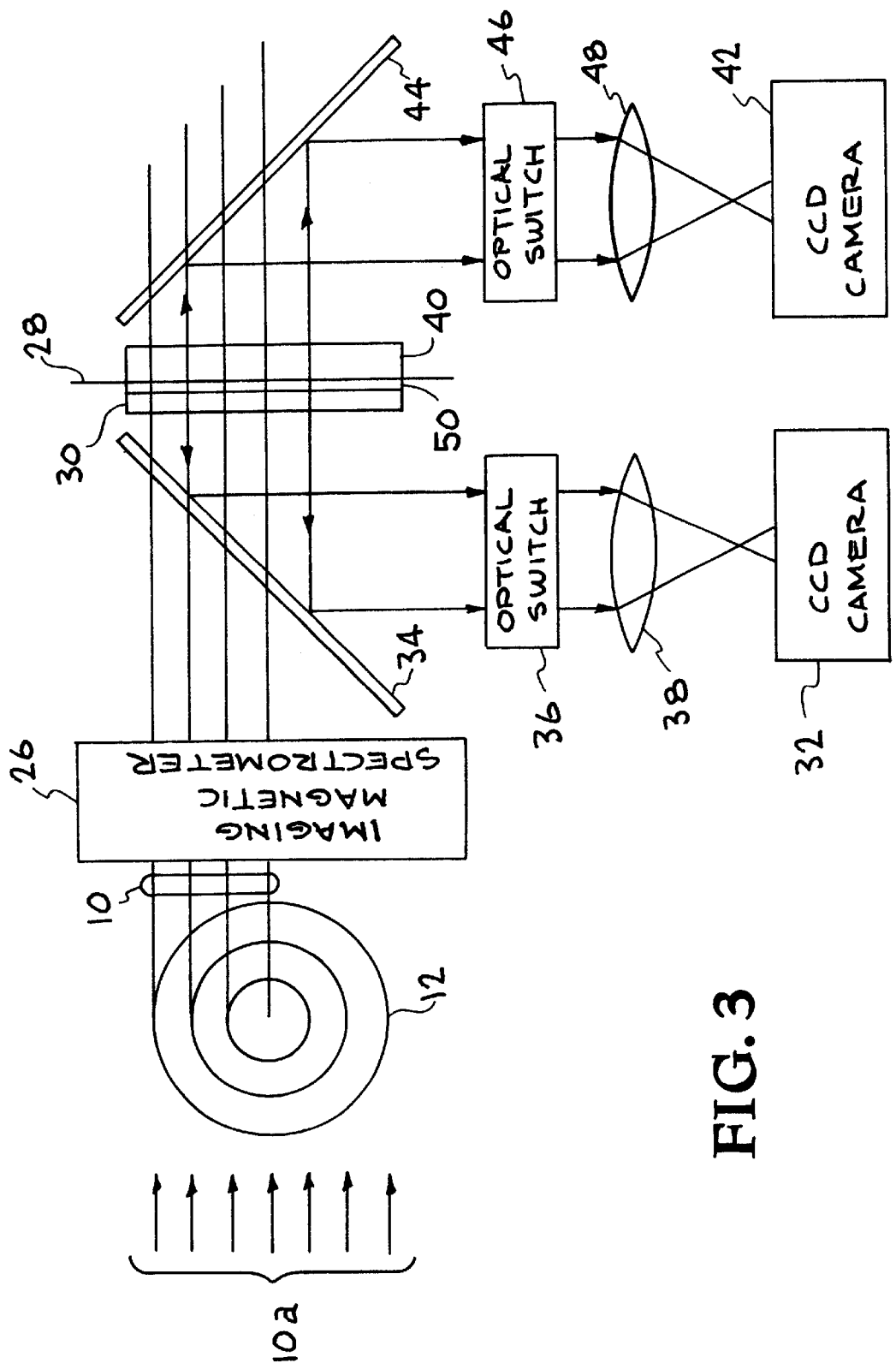
FIG. 3 is a schematic drawing illustrating the energy loss camera of the present invention.

Referring now to FIG. 3 which illustrates the energy-loss Cerenkov camera of the present invention utilizing the Cerenkov radiation, the target 12 (i.e., the object to be examined) is illuminated by the charged particle beam 10a. The charged particle beam 10 exiting the target 12 is directed through an imaging magnetic spectrometer 26, consisting of a set of two magnetic quadrupoles which acts as a magnetic lens to form the transmitted image of the particle beam at a focal plane 28. A scintillator 30, which produces photons in direct proportion to the number of particles impinging upon it, is disposed at focal plane 28. The scintillator light pattern produced by the impinging particles is imaged on an detecting/recording device 32, such as a CCD camera, to image the intensity of the scintillator light pattern. In order to remove the scintillator imaging optics and detector from the path of the high energy particle beam, the scintillator light pattern is coupled via scintillator reflector 34, optional optical switch 36 and optical imaging device (lens) 38 to the optical detection/recording device 32. The scintillator material may be one cm of polystyrene plastic.

A Cerenkov radiating medium 40 is also disposed at the focal plane 28. The radiating medium 40 is specifically chosen based on the expected particle beam energy and the line integrated density of the target 12 to be viewed. Typically, aerogel or xerogel may be used. These materials are advantageous because the material can be designed to have the appropriate index of refraction for the specific application. However with construction of suitable restraints around the medium, water, air, nitrogen, or other gases or liquids may be used. The Cerenkov light produced by the impinging particles is coupled to an optical detection/recording device, such as CCD camera 42, to image the intensity of the Cerenkov light pattern In order to remove the Cerenkov imaging optics and detector from the path of the high energy particle beam, the Cerenkov light pattern is coupled via a thin reflector 44, an optional optical switch 46 and optical imaging device (lens) 48 to the optical detection/recording device 42.

The reflectors 34 and 44 are preferably made of aluminized mylar, although thin silvered glass may also be used. In single burst mode, optical switches 36 and 46 are unnecessary. Because both the scintillator 30 and Cerenkov medium 40 are translucent or transparent, an optical block 50 is disposed between the two to prevent optical crosstalk between the two light emitters. The preferred optical block is black paper.

The paper entitled "An Energy-Loss Camera Based On Near-Threshold Cerenkov Radiation," by R. M. Bionta, H. S. Park, E. Ables, T. E. Cowan, F. S. Dietrich, E. P. Hartouni, and K. A. Van Bibber, appears in "Embedded Topical Meeting on Nuclear Applications of Accelerator Technology Proceedings", Albuquerque, N.Mex., Nov. 16–20, 1997, ISBN: 0-89448-629-2, is hereby incorporated by reference.

The foregoing description of preferred embodiments of the invention is presented for purposes of illustration and description and is not intended to be exhaustive or to limit the invention to the precise form disclosed. Many modifications and variations are possible in light of the above teaching.

What is claimed is:

1. Apparatus for providing a radiographic measurement of the linear column density of a target that is resistant to x-ray radiography comprising;
   (a) means for providing a beam of charged particles directed to pass through said target, said of charged particles having an unattenuated velocity before passing through said target;
   (b) a Cerenkov radiating medium disposed in the path of said beam of charged particles after said beam has passed through said target, said Cerenkov radiating medium being chosen to provide a threshold velocity for Cerenkov light emission that is just below the lowest anticipated velocity of the charged particles passing through the target;
   (c) a first optical detecting/recording device for detecting and recording the intensity of Cerenkov light pattern emitted by said Cerenkov radiating medium in response to said beam of charged particles, said intensity being related to the linear column density of the target in the path of said beam.

2. The apparatus of claim 1 further including:
   (a) a magnetic imaging system disposed in the path of said beam of charged particles between said target and said Cerenkov radiating medium for focusing the image of the beam of charged particles at a focal plane; and
   (b) wherein said Cerenkov radiating medium is disposed at said focal plane.

3. The apparatus of claim 2 further including first reflector means to allow the positioning of said first optical detecting/recording device away from the direct path of said beam of charged particles.

4. The apparatus of claim 2 wherein said means for providing a beam of charged particles provides a beam of high-mass charged particles.

5. The apparatus of claim 1 further comprising:
   (a) a scintillator disposed in the path of said beam of charged particles beam between said target and said Cerenkov radiating medium, said scintillator producing a light pattern in proportion to the number of particles from said beam of charged particles impinging on said scintillator; and
   (b) a second optical detecting/recording device for detecting and recording the intensity of scintillator light pattern emitted by said scintillator in response to said beam of charged particles.

6. The apparatus of claim 5 further including second reflector means to allow the positioning of said second optical detecting/recording device away from the direct path of said beam of charged particles.

7. The apparatus of claim 5 wherein said means for providing a beam of charged particles provides a beam of high-mass charged particles.

8. The apparatus of claim 5 wherein said scintillator is disposed at said focal plane.

9. The apparatus of claim 8 further comprising an optical block disposed between said scintillator and said Cerenkov medium.

10. The apparatus of claim 1 wherein said Cerenkov radiating medium is a aerogel material.

11. The apparatus of claim 1 wherein said Cerenkov radiating medium is a xerogel material.

12. The apparatus of claim 1 wherein said means for providing a beam of charged particles provides a beam of high-mass charged particles.

* * * * *